United States Patent
Tompkins

(10) Patent No.: US 7,154,040 B1
(45) Date of Patent: Dec. 26, 2006

(54) SUPPORT BRACKET FOR ELECTRICAL JUNCTION BOX

(76) Inventor: Philip M. Tompkins, 2420 S. Henney Rd., Choctaw, OK (US) 73020

( * ) Notice: Subject to any disclaimer, the term of this patent is extended or adjusted under 35 U.S.C. 154(b) by 0 days.

(21) Appl. No.: 11/328,276

(22) Filed: Jan. 9, 2006

(51) Int. Cl.
*H02G 3/08* (2006.01)

(52) U.S. Cl. .............................. 174/50; 174/53; 174/58; 220/3.2; 248/906

(58) Field of Classification Search ................ 174/50, 174/61, 54, 58, 53, 63, 480, 57, 481; 220/3.2, 220/3.3, 3.7, 3.8, 3.9, 4.02; 248/906, 127, 248/343; 439/535, 538; D13/152
See application file for complete search history.

(56) References Cited

U.S. PATENT DOCUMENTS

| | | | | |
|---|---|---|---|---|
| 1,982,957 A | * | 12/1934 | Knell | 220/3.9 |
| 3,730,466 A | * | 5/1973 | Swanquist | 248/906 |
| 3,977,640 A | | 8/1976 | Arnold et al. | |
| 4,447,030 A | * | 5/1984 | Nattel | 248/906 |
| 4,787,587 A | | 11/1988 | Deming | |
| 4,790,505 A | | 12/1988 | Rose et al. | |
| 4,943,022 A | | 7/1990 | Rinderer | |
| 4,978,092 A | * | 12/1990 | Nattel | 220/3.7 |
| 5,354,952 A | | 10/1994 | Hickey | |
| 5,405,111 A | * | 4/1995 | Medlin, Jr. | 248/906 |
| 5,452,873 A | * | 9/1995 | Laughlin | 248/906 |
| 5,646,371 A | | 7/1997 | Fabian | |
| 5,698,820 A | | 12/1997 | Collard | |
| 6,734,356 B1 | * | 5/2004 | Gretz | 174/58 |

\* cited by examiner

*Primary Examiner*—Angel R. Estrada
(74) *Attorney, Agent, or Firm*—Dunlap Codding & Rogers, P.C.

(57) ABSTRACT

A support bracket and method for supporting an electrical junction box. The support bracket has a substantially flat base with a pair of conduit receiving holes, a pair of legs extending from the base at an angular relationship to the base, and a flange extending from each of the legs at an angular relationship such that each flange is substantially parallel to the base. The junction box is connected to the base of the support bracket with a junction box and the base in a face to face contact and a conduit receiving opening of the junction box aligned with one of the conduit receiving holes of the support bracket.

8 Claims, 2 Drawing Sheets

SUPPORT BRACKET FOR ELECTRICAL JUNCTION BOX

CROSS REFERENCE TO RELATED APPLICATIONS

Not applicable.

BACKGROUND OF THE INVENTION

1. Field of the Invention

The present invention relates generally to mounting brackets, and more particularly, but not by way of limitation, to a bracket for supporting an electrical junction box.

2. Brief Description of the Related Art

Safety regulations require that wires carrying electrical current for operating lighting devices, motors, and other apparatus in buildings be strung safely and securely from each connection point to the next. The regulations require that connection points be within protective enclosures, such as outlet boxes, junction boxes, cabinets, and the like. Also, at least with respect to junction boxes, regulations require that the junction boxes be secured in position. In commercial buildings, the wires that extend from one junction box to the next are routed within a rigid, hollow conduit for protection. However, junction boxes that are located above the ceiling or in other open spaces where the junction box typically has a section of conduit extending vertically downwardly from the junction boxes are not typically braced. As such, the junction box appears to be supported by the rigid conduits which may be secured elsewhere, when in fact the junction box is susceptible to movement.

To this end, a need exists for a bracket that will effectively support an electrical junction box and which is easy to manufacture and install. It is to such a device that the present invention is directed.

DETAILED DESCRIPTION OF THE INVENTION

Figure 1:
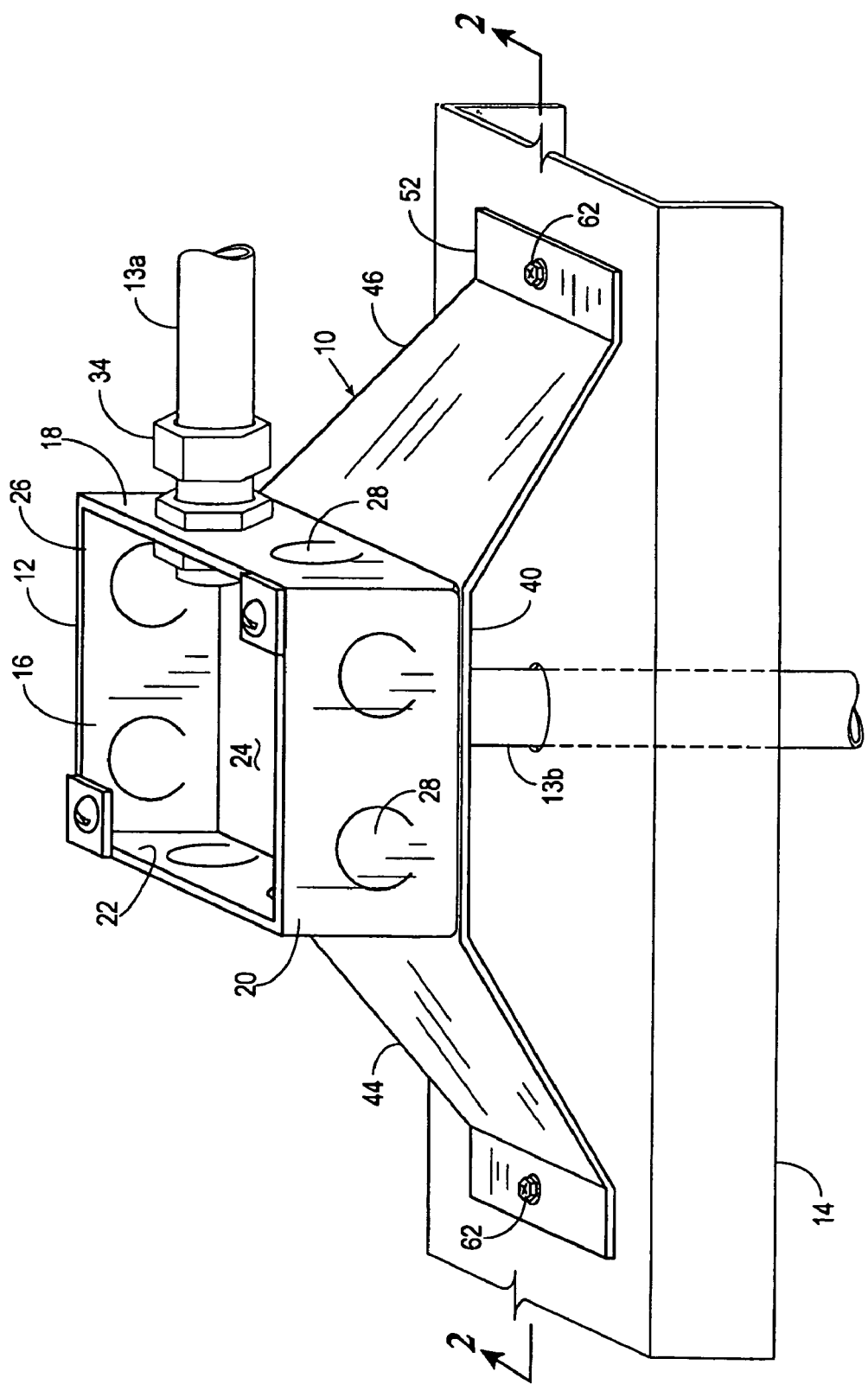
FIG. 1 is a perspective view of a support bracket constructed in accordance with the present invention shown supporting an electrical junction box.

Referring now to the drawings, and more particularly to FIG. 1, a support bracket 10, constructed in accordance with the present invention, for supporting an electrical junction box 12 and a plurality of conduits 13a and 13b on a support member 14 is shown. The electrical junction box 12 is generally rectangular in shape, having four side walls 16, 18, 20, and 22, a rear wall 24, and an open front 26. The side and rear walls 16–24 have a plurality of knockouts 28. The knockouts 28 are easily removed to provide conduit receiving openings and thereby allow a conduit, such as conduits 13a and 13b to be attached to the junction box 12 at that location for wiring of the junction box 12.

The conduit 13a is shown extending from a conduit receiving opening 29 (FIG. 2) of the side wall 18, and the conduit 13b is shown extending from a conduit receiving opening 30 of the rear wall 24 out and through a hole formed in the support member 14. Two mounting holes 31 and 32 are provided through the rear wall 24 for connecting the support bracket 10 (only one mounting hole 32 shown in FIG. 2). The conduit 13a is shown to be connected to the sidewall 16 of the junction box 12 with a conduit connector 34, and the conduit 13b is shown to be connected to the rear wall 24 of the junction box 12 with a conduit connector 36.

The support member 14 is illustrated as being a metal stud of generally channel shape providing a support surface 38. While a metal stud is shown in the drawings, it will be understood that the support bracket 10 of the present invention is also adapted for use with a cinder block or a wood stud.

The support bracket 10 is preferably constructed of sheet metal or other suitable non-metallic substance that meets Code requirements. The support bracket 10 has a substantially flat base 40 with a pair of conduit receiving holes 42a and 42b, a pair of legs 44 and 46 extending from the base 40 at an angular relationship to the base 40, and a pair of flanges 50 and 52 extending from each of the legs 44 and 46, respectively, at an angular relationship such that each flange 50 and 52 is substantially parallel to the base 40.

Figure 2:
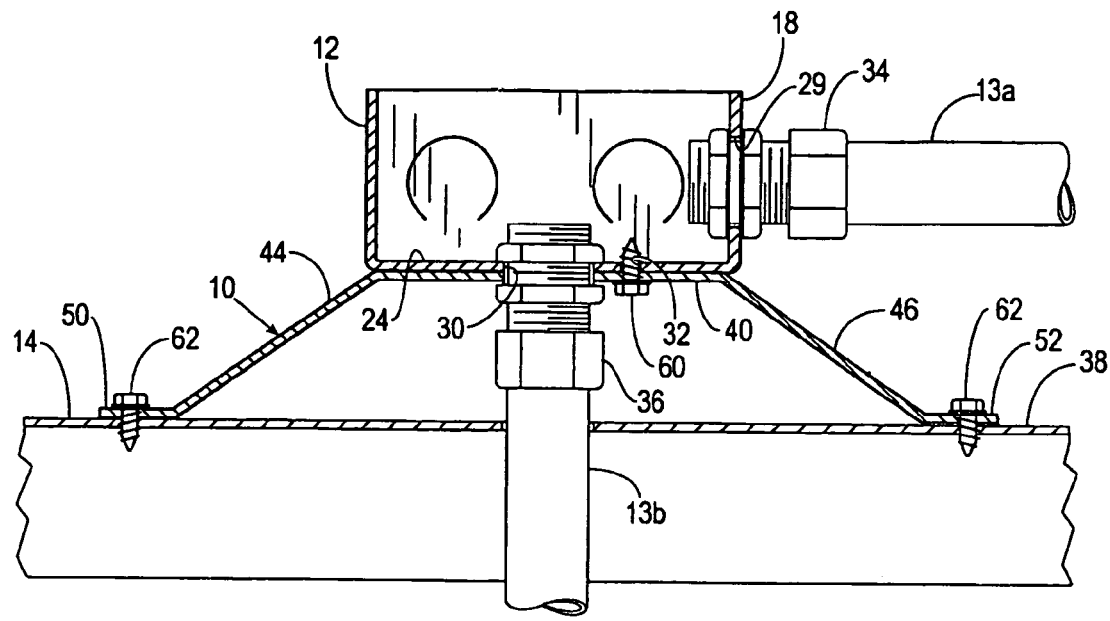
FIG. 2 is a partial, cross sectional view taken along lines 2—2 of FIG. 1.

As best shown in FIG. 2, the junction box 12 is connected to the base 40 of the support bracket 10 with the rear wall 24 and the base 40 in a face to face contact and the conduit receiving opening 30 of the junction box 12 aligned with the conduit receiving hole 42a of the support bracket 10. The base 40 is provided with a pair of mounting holes 56 and 58 which are alignable with the mounting holes of the junction box 12. The base 40 is secured to the junction box 12 with a suitable fastener, such as screws 60. Each of the flanges 50 and 52 is secured to the support surface 38 of the support member 14 with a suitable fastener, such as screws 62.

Figure 3:
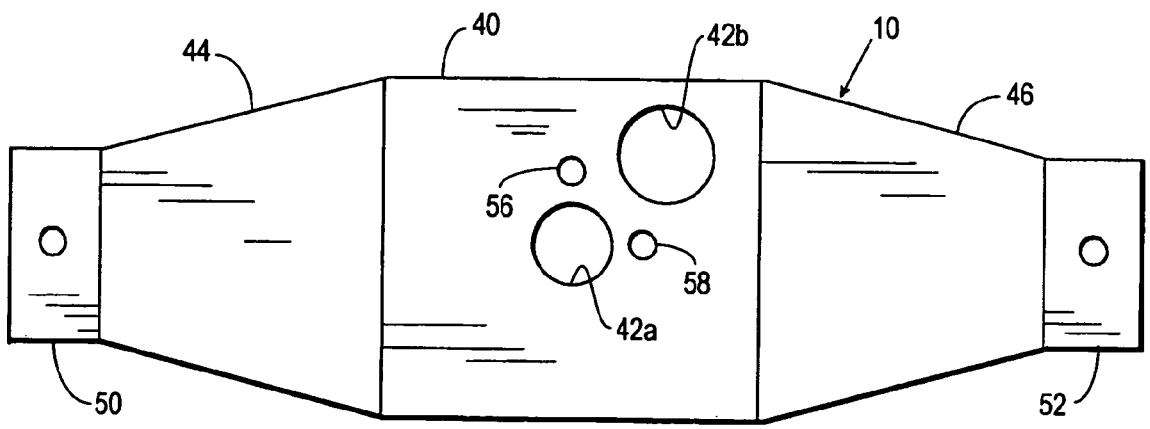
FIG. 3 is a top plan view of the support bracket of the present invention.

The base 40 is shown to be sized to substantially correspond to the size and shape of the rear wall 24 of the junction box 12. While junction box 12 is square in shape, it is to be understood that the present invention is applicable to octagonal junction boxes or those of any other available shape. The conduit receiving openings 42a and 42b are best shown in FIG. 3 to be different in size. It will be appreciated, however, that the base 40 may be constructed with a variety of arrangements of conduit receiving openings. That is, it is common in electrical networks, and it is also common for junction boxes to have different numbers, sizes, and locations of knock-outs to accommodate the conduits being used.

The legs 44 and 46 of the support bracket 10 are dimensioned so that at least a portion of the conduit connector 36 extending from the rear wall 24 of the junction box 12 is positionable between the base 40 of the support bracket 10 and the support surface 38. More specifically, the legs 44 and 46 are formed so that the base 40 and the flanges 50 and 52 are spaced vertically a distance of at least about one inch to accommodate the conduit connector 36. The legs 44 and 46 are shown to extend from the base 40 at an angle of about 45 degrees and to taper from the base 40 to the flanges 50 and 52.

It should be understood that while the support bracket 10 is shown being connected to a horizontal support surface, the support bracket 10 may be connected to other types of support members, for example a vertical stud or vertical cinder block surface. In addition, one of the sidewalls of the junction box may be secured to the base of the support bracket 10.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. An electrical junction box assembly, comprising:
    an electrical junction box having a plurality of sidewalls, a rear wall, and an open front, the rear wall and at least one of the sidewalls having a conduit receiving opening, the rear wall having a pair of mounting holes;
    a support bracket having a substantially flat base with a pair of conduit receiving holes, a pair of legs extending from the base at an angular relationship to the base, and a flange extending from each of the legs at an angular relationship such that each flange is substantially parallel to the base, the junction box connected to the base of the support bracket with the rear wall and the base in a face to face contact and the conduit receiving opening of the junction box aligned with one of the conduit receiving holes of the support bracket, each of the flanges secured to a support surface;
    a first conduit connector extending through the conduit receiving opening of the rear wall of the junction box and the conduit receiving hole of the support bracket and being connected to the junction box with a portion of the first conduit connector positioned between the base and the support surface;
    a first conduit extending perpendicular to the support surface and connected to the first conduit connector;
    a second conduit connector extending through the conduit receiving opening of the sidewall of the junction box and being connected to the junction box; and
    a second conduit extending substantially perpendicular to the first conduit and connected to the second conduit connector.

2. The junction box assembly of claim 1 wherein the conduit receiving hole of the base is a first conduit receiving hole, and wherein the base includes a second conduit receiving hole.

3. The junction box assembly of claim 2 wherein the first and second conduit receiving holes of the base are different in size.

4. The junction box assembly of claim 1 wherein the base of the support bracket and the rear wall of the junction box substantially correspond in shape and size.

5. The junction box assembly of claim 1 wherein the base and the flanges are spaced vertically a distance of at least one inch.

6. The junction box assembly of claim 1 wherein the angle between each leg of the support bracket and the base is less than 90 degrees.

7. The junction box assembly of claim 1 wherein the legs extend from opposite ends of the base.

8. A method for supporting an electrical junction box assembly, comprising:
    providing an electrical junction box having a plurality of sidewalls, a rear wall, and an open front, the rear wall and at least one of the sidewalls having a conduit receiving opening;
    providing a support bracket having a substantially flat base with a pair of conduit receiving holes, a pair of legs extending from the base at an angular relationship to the base, and a flange extending from each of the legs at an angular relationship such that each flange is substantially parallel to the base;
    connecting the junction box to the base of the support bracket with the rear wall and the base in a face to face contact and the conduit receiving opening of the junction box aligned with one of the conduit receiving holes of the support bracket;
    connecting a first conduit connector to the junction box with the first conduit connector extending through the conduit receiving opening of the rear wall of the junction box and the conduit receiving hole of the support bracket;
    connecting each of the flanges to a support surface with a portion of the first conduit connector positioned between the base and the support surface;
    connecting a first conduit extending perpendicular to the support surface to the first conduit connector;
    connecting a second conduit connector to the sidewall of the junction box; and
    connecting a second conduit extending substantially perpendicular to the first conduit to the second conduit connector.

* * * * *